US006170348B1

(12) United States Patent
Faucher et al.

(10) Patent No.: US 6,170,348 B1
(45) Date of Patent: Jan. 9, 2001

(54) SWING ARM TRANSMISSION FOR DRIVING SHEET FEED MECHANISM OF A PRINTING DEVICE MEDIA INPUT TRAY

(75) Inventors: Paul Faucher, Escondido; Michael Gustafson; Stephan Emmenegger, both of San Diego, all of CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/395,024

(22) Filed: Sep. 13, 1999

(51) Int. Cl.7 .................................................... F16H 3/34

(52) U.S. Cl. ........................................... 74/354; 400/629

(58) Field of Search ............................ 74/354; 271/270, 271/3.14, 109, 114; 400/624, 629

(56) References Cited

U.S. PATENT DOCUMENTS

| | | | | |
|---|---|---|---|---|
| 2,813,434 | | 11/1957 | Stuebs | 74/405 |
| 3,004,482 | | 10/1961 | Muller | 396/411 |
| 3,943,786 | | 3/1976 | Mills | 74/384 |
| 4,638,957 | | 1/1987 | Graves | 242/422 |
| 4,760,751 | | 8/1988 | Kasamatsu | 74/354 |
| 4,960,006 | | 10/1990 | Moore | 74/384 |
| 5,033,891 | * | 7/1991 | Kitazume et al. | 400/624 |
| 5,051,014 | * | 9/1991 | Takagi et al. | 400/625 |
| 5,213,426 | * | 5/1993 | Ewing | 74/354 X |
| 5,419,543 | * | 5/1995 | Nakamura et al. | 74/354 X |
| 5,531,531 | * | 7/1996 | Hirano | 271/121 X |
| 5,547,181 | * | 8/1996 | Underwood | 271/114 |
| 5,624,196 | * | 4/1997 | Jackson et al. | 400/625 |
| 5,672,019 | * | 9/1997 | Hiramatsu et al. | 400/624 |
| 5,697,716 | * | 12/1997 | Akahane | 400/624 |
| 5,740,696 | * | 4/1998 | Jean et al. | 74/354 |

* cited by examiner

*Primary Examiner*—Charles A. Marmor
*Assistant Examiner*—Ankur Parekh

(57) ABSTRACT

A transmission for transmitting power from a printing device drive to drive a media pick roller to pick individual sheets of print media from a supply tray through the printing device without the necessity of requiring a separate pick roller motor and controls. The transmission uses a sun gear and a planet gear with a cam track and follower to move the planet gear into and out of driving relationship with the pick roller.

20 Claims, 5 Drawing Sheets

SWING ARM TRANSMISSION FOR DRIVING SHEET FEED MECHANISM OF A PRINTING DEVICE MEDIA INPUT TRAY

CROSS REFERENCE TO RELATED APPLICATIONS, IF ANY

None.

BACKGROUND OF THE INVENTION AND PRIOR ART

The present invention relates to automatic printing devices such as desktop printers, copiers and similar devices which have a media supply tray which holds a stack of sheets of media on which printing is to take place or which are already printed and are to be copied. Throughout the present disclosure reference will be generally made to a "printing device" which is understood to encompass various types of printing devices including printers, copiers, combination printers and copiers, etc.

In typical printing devices, a first motor is used for driving the printing or copying elements and for movement of the sheet of paper or other media through the device. A separate motor is used for driving the media sheet pick roller or rollers which pick single sheets of media from the top (or sometimes bottom) of the media stack in the feed tray or supply tray. The present invention is directed to a transmission for transmitting power from the main printing device drive to drive a media pick roller and move individual sheets of media from a media supply tray through the printing device without the necessity of requiring a separate motor and controls for this purpose.

SUMMARY OF THE INVENTION

The present invention accordingly provides a transmission for transmitting power from a printing device drive to drive a media pick roller to move media from a printing device media supply tray comprising:

a) a support chassis;

b) a transmission power input gear mounted on said chassis;

c) a sun gear mounted on said chassis for rotation about a first axis and driveably connected to said power input gear;

d) a media pick roller drive gear mounted for rotation on said chassis;

e) a planetary gear mounting arm mounted on said chassis for pivotal movement about said first axis;

f) a planet gear mounted for rotation on said mounting arm, said planet gear being driveably connectable to said pick roller drive gear;

g) a cam track mounted on said chassis centered on said first axis and arcuately extending from a first location to a second location proximate said media pick roller drive gear, said cam track having a transmission engagement cam surface which inclines from said first location to said second location, said cam track also having a transmission reset cam surface spaced from said engagement cam surface, said reset cam surface extending from said second location to said first location;

h) a swing arm mounted on said chassis for movement with said mounting arm about said first axis, said swing arm having a cam follower thereon engageable with said cam track surfaces and said cam follower when engaged with said inclined engagement cam surface being resiliently biased away from said mounting arm; whereby, (1) during a transmission engagement phase, said power input gear may rotate said sun gear, said mounting arm and said swing arm together in a first direction to arcuately move said follower in engagement with said engagement cam surface from said first location to said second location to move said planet gear into driving relationship with said pick roller drive gear, (2) during a drive phase, said swing arm and said mounting arm remain stationary while power may be transmitted by rotation of said input gear in a second direction to rotate said sun gear to rotate said planet gear to rotate said drive gear, (3) during a transmission disengagement phase, said power input gear again may rotate said sun gear, said mounting arm and said swing arm together in said first direction to arcuately move said follower past an end of said cam track to disengage said follower from said engagement cam surface and to disengage said planet gear from driving relationship with said pick roller drive gear, and (4) during a reset phase, said power input gear may rotate said sun gear, said mounting arm and said swing arm in a second direction with said follower engaged with said reset cam surface to return said mounting arm and said swing arm to said first position.

The present invention further provides a printing device having a chassis and a media input tray and media sheet pick roller for feeding individual sheets of media from said tray to a media travel path in said printing device, said printing device including a transmission transmitting power from a main drive gear (11) in said printing device drive to drive said media pick roller, said transmission comprising:

a) a transmission power input gear mounted on said chassis in engagement with said main drive gear;

b) a sun gear mounted on said chassis for rotation about a first axis and driveably connected to said power input gear;

c) a media pick roller drive gear mounted for rotation on said chassis in driving engagement with said pick roller;

d) a planetary gear mounting arm mounted on said chassis for pivotal movement about said first axis;

e) a planet gear mounted for rotation on said mounting arm, said planet gear being driveably connectable to said pick roller drive gear;

f) a cam track mounted on said chassis centered on said first axis and arcuately extending from a first location to a second location proximate said media pick roller drive gear, said cam track having a transmission engagement cam surface which inclines from said first location to said second location, said cam track also having a transmission reset cam surface spaced from said engagement cam surface, said reset cam surface extending from said second location to said first location;

g) a swing arm mounted on said chassis for movement with said mounting arm about said first axis, said swing arm having a cam follower thereon engageable with said cam track surfaces and said cam follower when engaged with said inclined engagement cam surface being resiliently biased away from said mounting arm;

whereby, (1) during a transmission engagement phase, said main drive gear may rotate said power input gear, said sun gear, said mounting arm and said swing arm together in a first direction to arcuately move said follower in engagement with said engagement cam surface from said first location to said second location to move said planet gear into driving relationship with said pick roller drive gear, (2) during a media pick phase, said swing arm and said mounting arm remain stationary while power may be transmitted by reverse rotation of said main drive gear in a second direction to rotate said input gear, sun gear and said planet gear to rotate said pick roller drive gear, (3) during a transmission disengagement phase, said main drive gear again may rotate said input gear, sun gear, said mounting arm and said swing arm together in said first direction to arcuately move said follower past an end of said cam track to disengage said follower from said engagement cam surface and to disengage said planet gear from driving relationship with said pick roller drive gear, and (4) during a reset phase, said main drive gear may rotate said power input gear, said sun gear, said mounting arm and said swing arm in a second direction with said follower engaged with said reset cam surface to return said mounting arm and said swing arm to said first position.

DESCRIPTION OF THE PREFERRED EMBODIMENT

Figure 1:
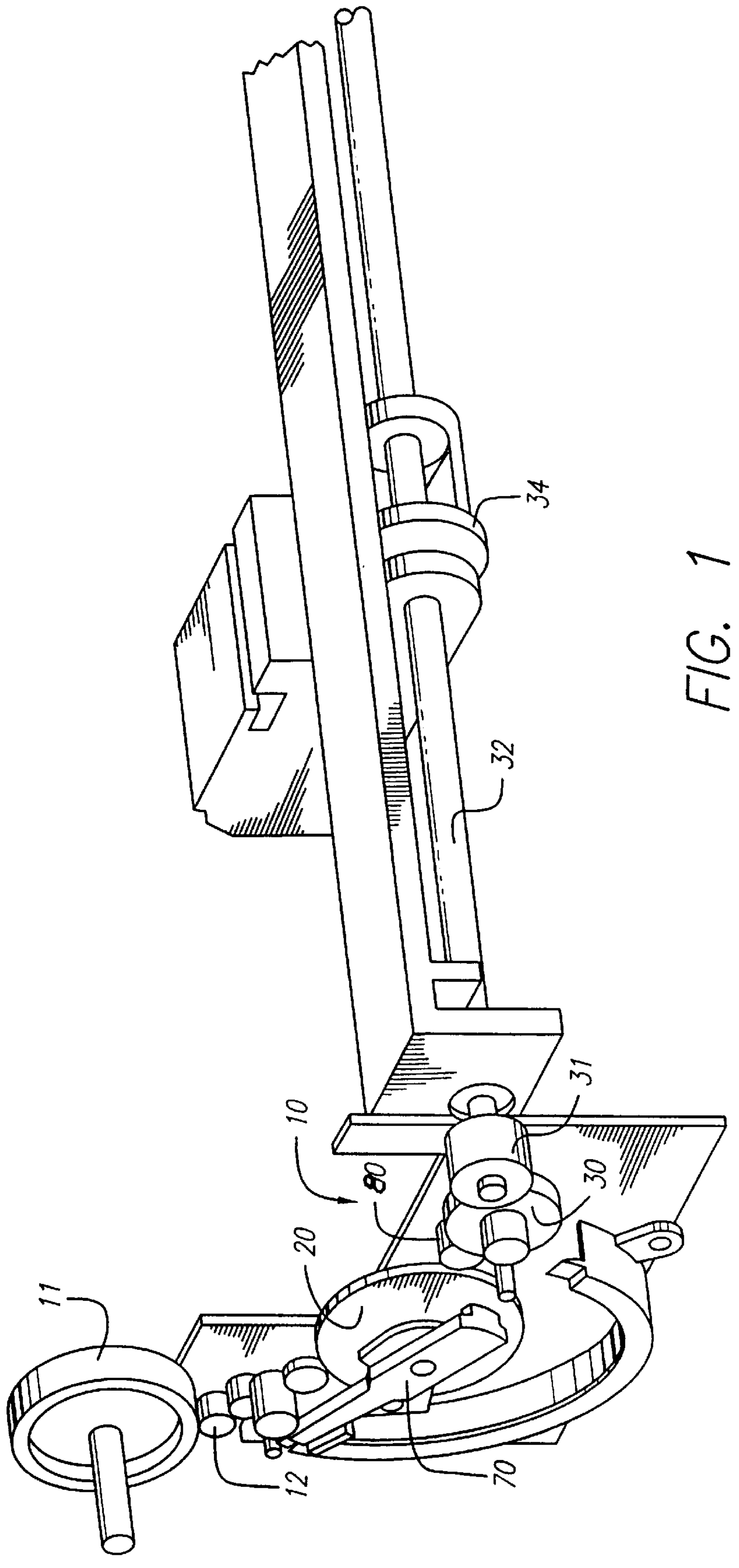
FIG. 1 is a schematic partial perspective view of the transmission and its connection to a pick roller drive shaft and media pick rollers for a print media supply tray.

FIG. 1 is a schematic partial perspective view of the transmission of the present invention and its connection to a pick roller drive shaft and media pick roller for a print media supply tray. The transmission itself is mounted on a support chassis 10 which may comprise a side plate of the printing device. The transmission receives rotary input power from a main drive gear 11 of the printer and selectively transmits power to a pick shaft driven gear 31 which is in turn connected to a pick roller drive shaft 32 having one or more rotary pick rollers 34 thereon which have a surface suitable for frictionally engaging the top sheet of a stack of paper or other media to move it from the stack to the media path through the printing device.

Figure 2:
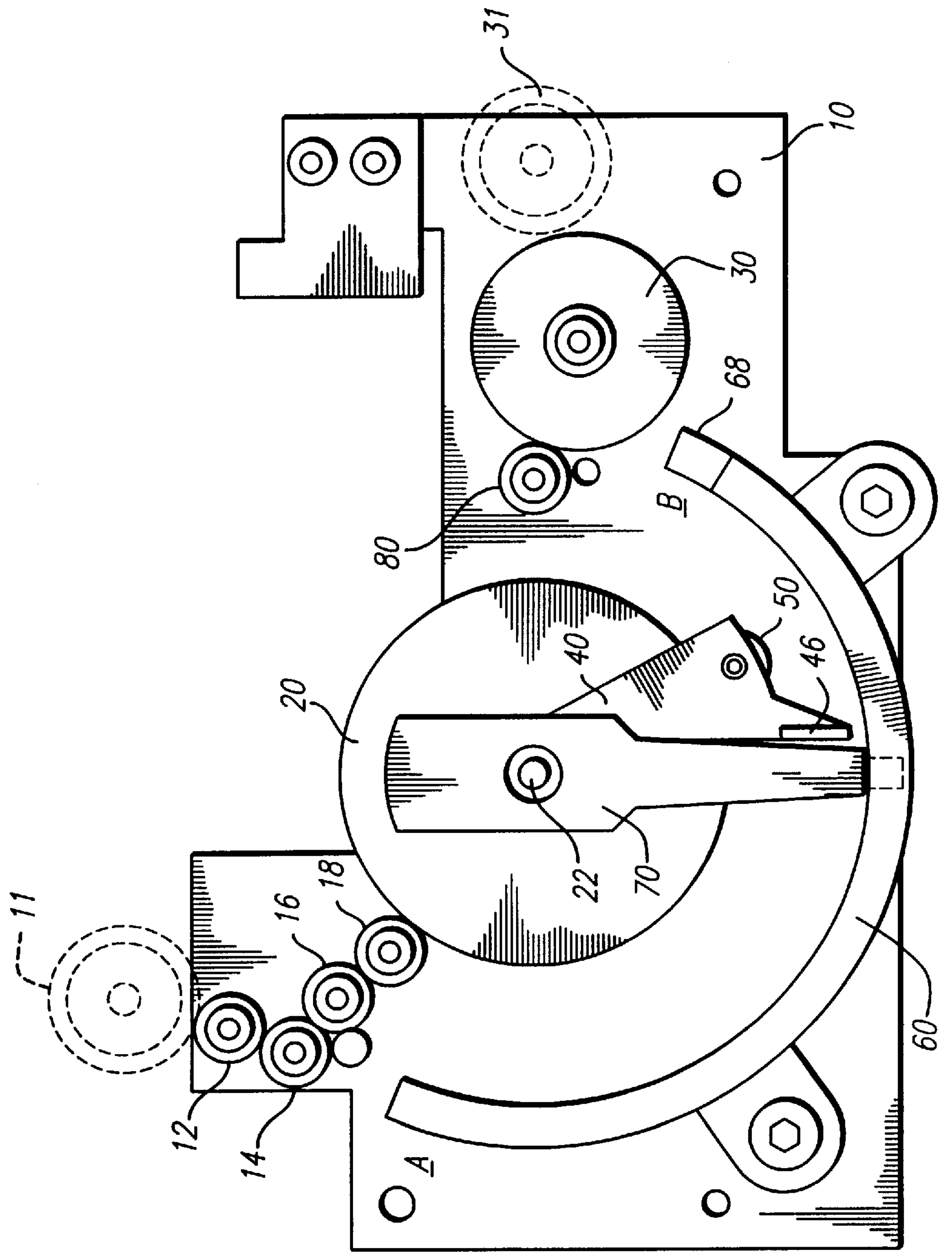
FIG. 2 is a front elevation view of the transmission.
Figure 8:
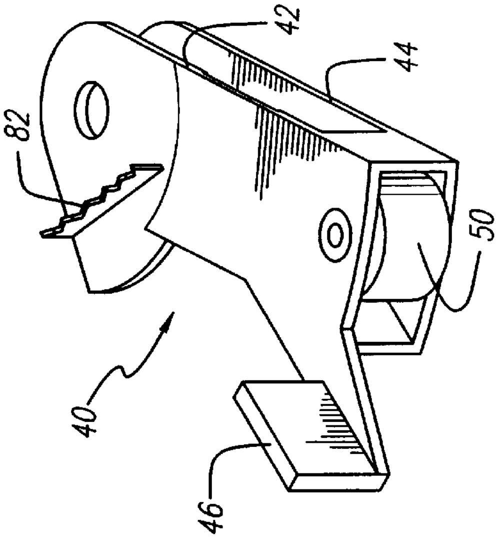
FIG. 8 is a perspective view of a mounting arm for a planet gear.

As seen in FIG. 2, where the main printer drive gear 11 and the pick shaft driven gear 31 are shown in phantom, the transmission comprises a power input gear 12 mounted on the chassis 10 which, through a series of intermediate gears 14, 16, 18, engages a sun gear 20 which is mounted for rotation with respect to the chassis 10 on a shaft 22. Also mounted on shaft 22 is a planet gear mounting arm 40 having a pair of spaced legs 42, 44 best seen in FIGS. 8 and 10. A planet gear 50 having teeth engaged with the teeth of the sun gear 20 is mounted for rotation on the mounting arm 40 for planetary movement with respect to the sun gear 20.

Figure 4:
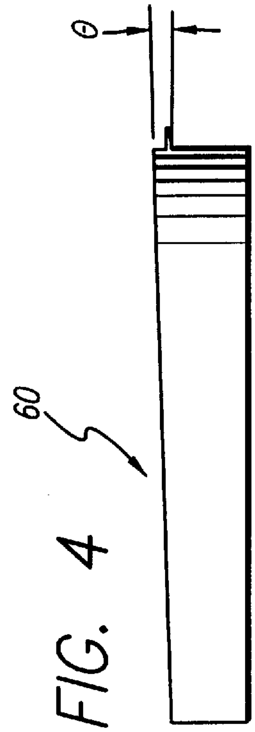
FIG. 4 is a bottom plan view of the cam track.
Figure 4A:
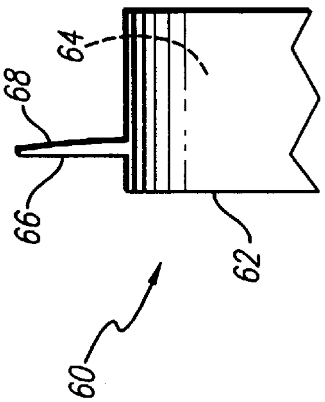
FIG. 4*a* is a right side elevation of the catch point end of the cam track.
Figure 3:
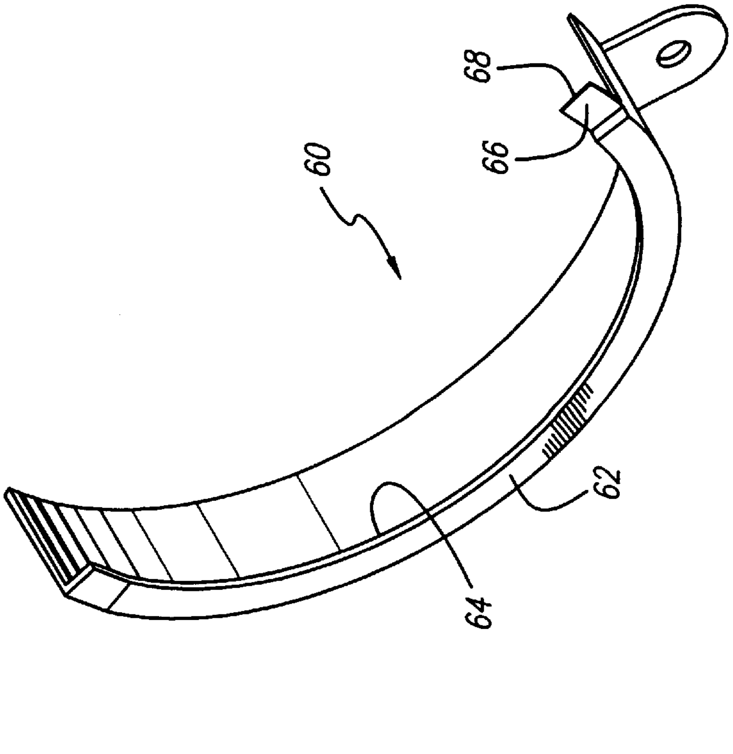
FIG. 3 is a perspective view of an arcuate cam track.
Figure 7:
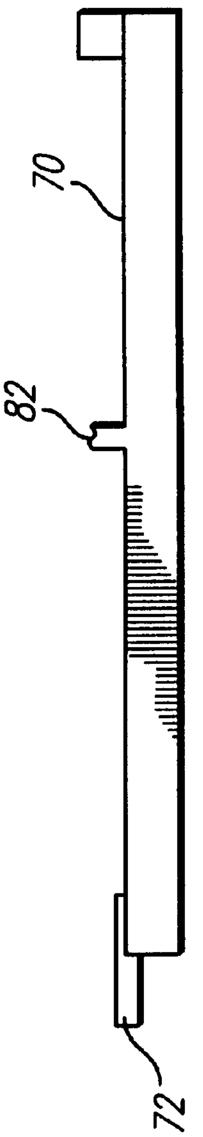
FIG. 7 is a top side view of the swing arm.
Figure 5:
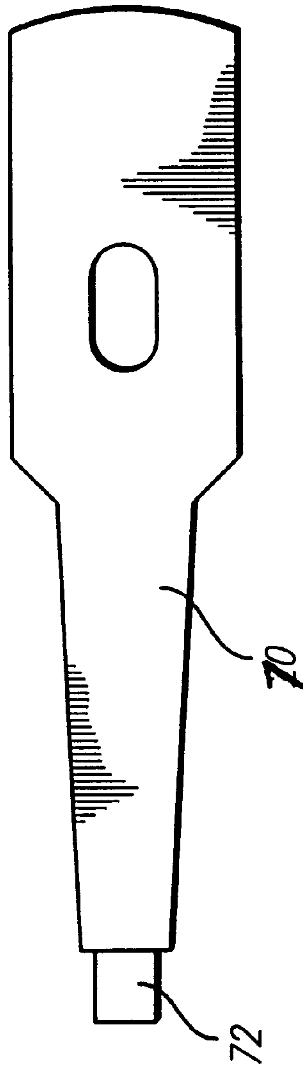
FIG. 5 is a front elevation view of a swing arm.
Figure 6:
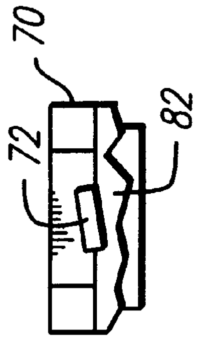
FIG. 6 is an end view of the swing arm showing the follower end.

An arcuate cam track 60 is also mounted on the chassis 10 and is centered on the axis of shaft 22 and extends from a first location A proximate the power input gear 12 to a second location B proximate the media pick roller drive gear 30. The cam track 60 has a transmission engagement cam surface 62 which inclines away from the plane of the chassis 10 in a counterclockwise direction as seen in FIG. 2 from the first location A near the power input gear 12 to the second location B near the media pick roller drive gear 30. Preferably, the cam track 60 has an engagement cam surface 62 which continuously extends at an angle θ with respect to the base plane of the chassis 10 as seen in FIG. 4. As shown, the transmission engagement cam surface 62 comprises a surface of a flange on the cam track which faces outwardly of the chassis 10 and also has a lower inwardly facing flange surface 64 which comprises a cam reset surface which extends in the reverse or counterclockwise location from the second location B proximate the media pick roller drive gear 30 back to the first location A proximate the power input gear 12. The end of the cam track 60 proximate the paper pick drive gear 30 is stepped to provide a cam follower catch surface 66 and a tongue 68 seen in FIGS. 3 and 4*a* for a purpose to be described.

A swing arm 70 is also mounted on the chassis 10 for movement about the axis of the shaft 22 together with the mounting arm 40. The swing arm has a cam follower 72 at its radially outermost end, the follower 72 having lower and upper surfaces respectively engageable with the upper and lower cam track surfaces 62, 64. Movement of the cam follower 72 in the counterclockwise direction in engagement with the cam surface 62 past the catch surface 66 on the end of the cam track 60 prevents movement of the follower in the reverse or clockwise direction from the catch surface 66 back to the engagement cam surface 62. Continued counterclockwise movement of the follower all the way past the end of the tongue 68 on the cam track results in engagement of the upper surface of the cam follower 72 with the underside of the tongue 68 to guide the cam follower 72 into engagement with the reset cam surface 64.

Figure 10:
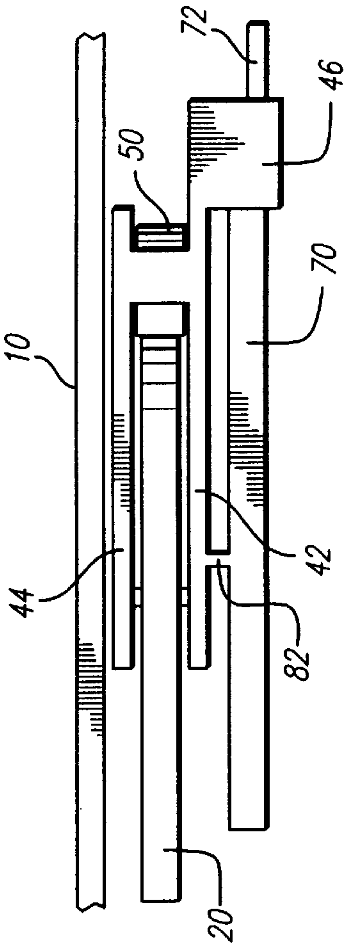
FIG. 10 is a top view of the mounting arm.
Figure 11:
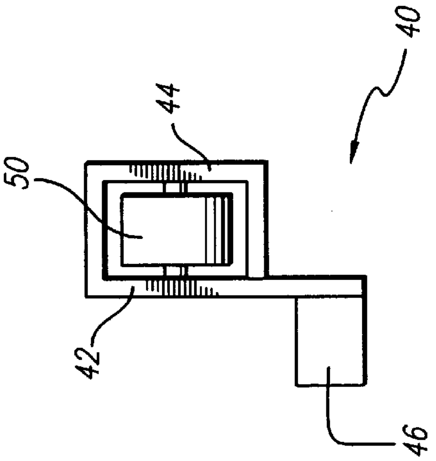
FIG. 11 is an end view of the mounting arm showing a rotation limit stop and cam follower guide.
Figure 9:
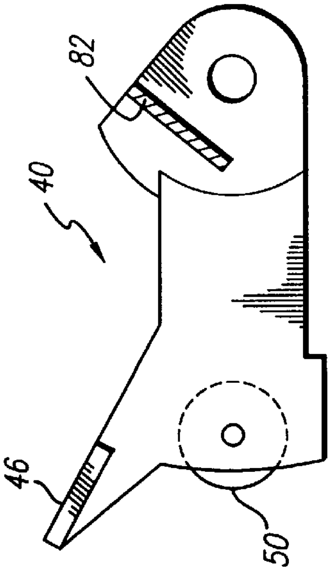
FIG. 9 is a front elevation view of the mounting arm.

A resilient cushion or spring 90 seen in FIG. 10 extends between facing surfaces of the mounting arm leg 44 and the swing arm 70 which in turn are preferably formed as an integral unit interconnected by a flexible tab 82. The spring or resilient cushion 90 thus biases the swing arm away from the chassis 10 in an axial plane extending through the axis of shaft 22 toward the reset cam surface 64 and in a direction to engage the engagement cam surface 62 during reset of the transmission when the cam follower is at the first end of the cam track at location A.

The mounting arm 40 is preferably provided with a guide surface 46 thereon which engages a side edge of the swing arm 70 as seen in FIG. 2 to guide movement of the swing arm in the axial plane extending through the axis of shaft 22.

Operation of the transmission in a complete cycle of operation which comprises four separate phases will now be described. As seen in FIG. 2, in the first or transmission engagement phase of operation, the transmission input gear 12 is first driven in a counterclockwise direction by the main drive gear 11. This, via gears 14–18 causes rotation of the sun gear 20, the mounting arm 40 and the swing arm 70 as a unit from the first location A where the cam follower 72 engages the engagement cam surface 62 of the cam track. Continued movement of the sun gear 20, mounting arm 40 and swing arm 70 in a counterclockwise direction causes the cam follower 72 to gradually move away from the plane of the chassis 10 as it follows the inclined engagement surface 62 of the cam track until it reaches location B where the follower 72 passes the catch surface 66 but is still in engagement with the cam track 60. At this location B the planet gear 50 moves into driving relationship with the pick roller drive gear 30 due to engagement of the teeth of the planet gear 50 with the teeth of an intermediate speed reducing gear 80.

In the second phase of operation which comprises a media pick roller drive phase, the swing arm 70 and mounting arm 40 remain stationary while power is transmitted by reverse rotation of the input gear 12 in a second direction (clockwise caused by reverse rotation of the main drive gear 11 whereby the sun gear 20 and planet gear 50 rotate the media pick roller drive gear 30 in the sheet picking direction (counterclockwise as shown).

The third phase of the complete cycle of operation of the transmission comprises a transmission disengagement phase in which rotary power is no longer transmitted from the planet gear 50 to the pick roller drive gear 30 via the speed reducing gear 80. Disengagement of the transmission is caused by again rotating the power input gear 12 in the original counterclockwise direction to arcuately move the cam follower 72 past the end of the tongue 68 of the cam shaft to disengage the follower from the tongue 68 and to disengage the planet gear 50 from driving relationship with the pick roller drive gear 30.

The fourth or reset phase of the cycle of operation involves returning of the interconnected mounting arm 40 and swing arm 70 in the clockwise direction from position B to position A as the follower 72 is engaged with the reset cam surface 64.

The transmission thus described is a purely mechanical solution for controlling and powering a media pick roller.

The transmission is configured to mate with existing gears 11, 31 on the printer chassis. Initial reverse and subsequent forward motion of the main drive gear 11 results in media being picked from the tray. Under rotation or over rotation of the transmission elements do not result in transmission engagement. Once engaged, the transmission can be rotated indefinitely and will continuously drive the paper media pick roller or rollers 34. A small reverse rotation of the power input gears will disengage (reset) the transmission from the engaged state and large reverse rotations from the printer drive while in the engaged state will not cause any difficulty and will also reset the transmission. During the engagement phase of rotation (reverse rotation) the swing arm 70 follows the inclined engagement cam track surface 62 resulting in engagement of the planet gear 50 with the pick roller drive gear 30 via the speed reducing gear 80. Once the transmission is engaged, further rotation can be controlled accurately even with fluctuating torque loads. The swing arm 70 can now be accurately rotated the remainder of the way past the catch surface 66 and end of tongue 68 of the cam track. The catch surface thus permits the swing arm 70 to rotate only in the reverse (counterclockwise) direction like a ratchet or pawl. At this point, the swing arm pivots back to its relaxed position and disengages the face of the sun gear 20. The transmission is now engaged and ready for forward rotation. Once the desired forward rotation is complete, a small reverse rotation disengages the transmission by sliding the swing arm 70 off the end of the tongue 68 of the cam allowing it to rotate back under the cam surface 62 against the cam surface 64.

Persons skilled in the art will appreciate that various modifications can be made in the preferred embodiment shown and described above and that the scope of protection is limited only by the wording of the claims which follow. For example, the various gears 14, 16, 18 and 80 are not essential. Additionally, the mounting arm 40 and swing arm 70 need not be constructed as a single piece. Other changes can be made in the transmission as will be appreciated by persons skilled in the art without departing from the teachings of the invention.

What is claimed is:

1. A transmission for transmitting power from a printing device drive to drive a media pick roller to move media from a printing device media supply tray comprising:

a) a support chassis;

b) a transmission power input gear mounted on said chassis;

c) a sun gear mounted on said chassis for rotation about a first axis and driveably connected to said power input gear;

d) a media pick roller drive gear mounted for rotation on said chassis;

e) a planetary gear mounting arm mounted on said chassis for pivotal movement about said first axis;

f) a planet gear mounted for rotation on said mounting arm, said planet gear being driveably connectable to said pick roller drive gear;

g) a cam track mounted on said chassis centered on said first axis and arcuately extending from a first location to a second location proximate said media pick roller drive gear, said cam track having a transmission engagement cam surface which inclines from said first location to said second location, said cam track also having a transmission reset cam surface spaced from said engagement cam surface, said reset cam surface extending from said second location to said first location;

h) a swing arm mounted on said chassis for movement with said mounting arm about said first axis, said swing arm having a cam follower thereon engageable with said cam track surfaces and said cam follower when engaged with said inclined engagement cam surface being resiliently biased away from said mounting arm; whereby, (1) during a transmission engagement phase, said power input gear may rotate said sun gear, said mounting arm and said swing arm together in a first direction to arcuately move said follower in engagement with said engagement cam surface from said first location to said second location to move said planet gear into driving relationship with said pick roller drive gear, (2) during a drive phase, said swing arm and said mounting arm remain stationary while power may be transmitted by rotation of said input gear in a second direction to rotate said sun gear to rotate said planet gear to rotate said drive gear, (3) during a transmission disengagement phase, said power input gear again may rotate said sun gear, said mounting arm and said swing arm together in said first direction to arcuately move said follower past an end of said cam track to disengage said follower from said engagement cam surface and to disengage said planet gear from driving relationship with said pick roller drive gear, and (4) during a reset phase, said power input gear may rotate said sun gear, said mounting arm and said swing arm in a second direction with said follower engaged with said reset cam surface to return said mounting arm and said swing arm to said first position.

2. The transmission of claim 1, further comprising a series of input gears for transmitting rotary power from said power input gear to said sun gear.

3. The transmission of claim 2, further comprising a gear for transmitting rotary power from said planet gear to said pick roller drive gear.

4. The transmission of claim 3, wherein said gear for transmitting power from said planet gear is a speed reducing gear.

5. The transmission of claim 1, further comprising a catch surface on said cam track to receive said follower as said swing arm and mounting arm move said planet gear to drive position, said catch surface configured to prevent movement of said follower from said catch surface back to said engagement cam surface during said drive phase.

6. The transmission of claim 5, further comprising a guide tongue on said cam for guiding said follower to said disengagement surface during said disengagement phase.

7. The transmission of claim 1, further comprising a resilient cushion between said mounting arm and said swing arm proximate said first axis for biasing said swing arm in an axial plane which extends through said first axis toward said reset cam surface in a direction to engage said engagement cam surface during reset at said first end of said cam track.

8. The transmission of claim 7, wherein said mounting arm includes two spaced legs, said sun gear extending between said legs.

9. The transmission of claim 8, wherein said swing arm and said mounting arm are formed as a single piece.

10. The transmission of claim 7, wherein said mounting arm has a guide surface thereon engageable with a side edge of said swing arm for guiding movement of said swing arm in said plane.

11. A printing device having a chassis and a media input tray and media sheet pick roller for feeding individual sheets of media from said tray to a media travel path in said printing device, said printing device including a transmission transmitting power from a main drive gear (11) in said printing device drive to drive said media pick roller, said transmission comprising:

a) a transmission power input gear mounted on said chassis in engagement with said main drive gear;

b) a sun gear mounted on said chassis for rotation about a first axis and driveably connected to said power input gear;

c) a media pick roller drive gear mounted for rotation on said chassis in driving engagement with said pick roller;

d) a planetary gear mounting arm mounted on said chassis for pivotal movement about said first axis;

e) a planet gear mounted for rotation on said mounting arm, said planet gear being driveably connectable to said pick roller drive gear;

f) a cam track mounted on said chassis centered on said first axis and arcuately extending from a first location to a second location proximate said media pick roller drive gear, said cam track having a transmission engagement cam surface which inclines from said first location to said second location, said cam track also having a transmission reset cam surface spaced from said engagement cam surface, said reset cam surface extending from said second location to said first location;

g) a swing arm mounted on said chassis for movement with said mounting arm about said first axis, said swing arm having a cam follower thereon engageable with said cam track surfaces and said cam follower when engaged with said inclined engagement cam surface being resiliently biased away from said mounting arm;

whereby, (1) during a transmission engagement phase, said main drive gear may rotate said power input gear, said sun gear, said mounting arm and said swing arm together in a first direction to arcuately move said follower in engagement with said engagement cam surface from said first location to said second location to move said planet gear into driving relationship with said pick roller drive gear, (2) during a media pick phase, said swing arm and said mounting arm remain stationary while power may be transmitted by reverse rotation of said main drive gear in a second direction to rotate said input gear, sun gear and said planet gear to rotate said pick roller drive gear, (3) during a transmission disengagement phase, said main drive gear again may rotate said input gear, sun gear, said mounting arm and said swing arm together in said first direction to arcuately move said follower past an end of said cam track to disengage said follower from said engagement cam surface and to disengage said planet gear from driving relationship with said pick roller drive gear, and (4) during a reset phase, said main drive gear may rotate said power input gear, said sun gear, said mounting arm and said swing arm in a second direction with said follower engaged with said reset cam surface to return said mounting arm and said swing arm to said first position.

12. The printing device of claim 11, further comprising a series of input gears for transmitting rotary power from said power input gear to said sun gear.

13. The printing device of claim 12, further comprising a gear for transmitting rotary power from said planet gear to said pick roller drive gear.

14. The printing device of claim 13, wherein said gear for transmitting power from said planet gear is a speed reducing gear.

15. The printing device of claim 11, further comprising a catch surface on said cam track to receive said follower as said swing arm and mounting arm move said planet gear to drive position, said catch surface configured to prevent movement of said follower from said catch surface back to said engagement cam surface during said drive phase.

16. The printing device of claim 15, further comprising a guide tongue on said cam for guiding said follower to said disengagement surface during said disengagement phase.

17. The printing device of claim 11, further comprising a resilient cushion between said mounting arm and said swing arm proximate said first axis for biasing said swing arm in an axial plane which extends through said first axis toward said reset cam surface in a direction to engage said engagement cam surface during reset at said first end of said cam track.

18. The printing device of claim 17, wherein said mounting arm includes two spaced legs, said sun gear extending between said legs.

19. The printing device of claim 18, wherein said swing arm and said mounting arm are formed as a single piece.

20. The printing device of claim 17, wherein said mounting arm has a guide surface thereon engageable with a side edge of said swing arm for guiding movement of said swing arm in said plane.

* * * * *